US012650091B2

(12) United States Patent
Alecu et al.

(10) Patent No.: US 12,650,091 B2
(45) Date of Patent: Jun. 9, 2026

(54) DUAL BYPASS TURBOFAN GAS TURBINE ENGINE

(71) Applicant: PRATT & WHITNEY CANADA CORP., Longueuil (CA)

(72) Inventors: Daniel Alecu, Brampton (CA); David Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 155 days.

(21) Appl. No.: 18/243,346

(22) Filed: Sep. 7, 2023

(65) Prior Publication Data

US 2025/0084784 A1 Mar. 13, 2025

(51) Int. Cl.
*F02C 3/06* (2006.01)
*F02C 3/067* (2006.01)
(Continued)

(52) U.S. Cl.
CPC ................ *F02C 3/06* (2013.01); *F02C 3/145* (2013.01); *F02C 7/143* (2013.01); *F02C 7/36* (2013.01);
(Continued)

(58) Field of Classification Search
CPC ........ F02K 3/077; F02K 3/072; F02K 1/1207; F02C 3/06; F02C 3/067; F02C 3/145; F02C 7/143; F02C 7/26; F02C 9/18; F05D 2260/213; F05D 2260/606; F05D 2260/40311
See application file for complete search history.

(56) References Cited

U.S. PATENT DOCUMENTS 2,504,181 A * 4/1950 Constant ................. F02K 3/065
60/268
3,729,957 A 5/1973 Petrie et al.
(Continued)

FOREIGN PATENT DOCUMENTS

EP 3077642 B1 7/2019

OTHER PUBLICATIONS

European Patent Office, Communication re extended European search report for European patent application No. 24198749.4, Jan. 24, 2025.

*Primary Examiner* — Jason H Duger
(74) *Attorney, Agent, or Firm* — Norton Rose Fulbright Canada LLP

(57) ABSTRACT

Dual bypass gas turbine engines and associated methods are provides. A dual bypass turbofan gas turbine engine includes counter-rotating first and second fans through which ambient air is received and propelled in an aft direction; a first bypass duct receiving first bypass air including a first portion of the propelled air; a second bypass duct receiving second bypass air including a second portion of the propelled air; a core gas path receiving core air including a third portion of the propelled air; a compressor pressurizing the core air; an intercooler facilitating heat removal from the pressurized core air; a combustor in which the pressurized core air is mixed with fuel and ignited to generate a stream of combustion gas; a turbine extracting energy from the combustion gas; and a differential gear train apportioning an input torque received from the turbine between the first fan and the second fan.

13 Claims, 5 Drawing Sheets

(51) Int. Cl.

| | |
|---|---|
| *F02C 3/14* | (2006.01) |
| *F02C 7/143* | (2006.01) |
| *F02C 7/36* | (2006.01) |
| *F02C 9/18* | (2006.01) |
| *F02K 1/12* | (2006.01) |
| *F02K 3/072* | (2006.01) |
| *F02K 3/077* | (2006.01) |

(52) U.S. Cl.
CPC .............. *F02C 9/18* (2013.01); *F02K 1/1207* (2013.01); *F02K 3/072* (2013.01); *F02K 3/077* (2013.01); *F02C 3/067* (2013.01); *F05D 2260/213* (2013.01); *F05D 2260/40311* (2013.01); *F05D 2260/606* (2013.01)

(56) References Cited

U.S. PATENT DOCUMENTS

| | | | | |
|---|---|---|---|---|
| 4,050,242 | A | * | 9/1977 | Dusa ....................... F02K 3/077 |
| | | | | 60/226.1 |
| 7,614,210 | B2 | | 11/2009 | Powell et al. |
| 8,100,630 | B2 | | 1/2012 | Guemmer |
| 8,590,286 | B2 | | 11/2013 | Roberge et al. |
| 10,030,606 | B2 | * | 7/2018 | Moon ........................ F02K 1/46 |
| 10,066,550 | B2 | | 9/2018 | Riehle et al. |
| 2007/0186535 | A1 | * | 8/2007 | Powell .................... F02K 3/077 |
| | | | | 60/263 |
| 2013/0255224 | A1 | * | 10/2013 | Kupratis ................... F02C 9/18 |
| | | | | 60/39.15 |
| 2015/0252732 | A1 | * | 9/2015 | Kupratis ................... F02C 9/18 |
| | | | | 60/226.3 |
| 2015/0322855 | A1 | * | 11/2015 | Kupratis ................... F02C 3/06 |
| | | | | 60/805 |
| 2015/0345384 | A1 | * | 12/2015 | Kupratis ................... F02C 3/05 |
| | | | | 60/726 |
| 2016/0305324 | A1 | * | 10/2016 | Magowan ............... F02C 7/185 |
| 2016/0326954 | A1 | * | 11/2016 | Kupratis ................ F02C 3/145 |
| 2019/0078453 | A1 | * | 3/2019 | Roberge ................. F02K 3/077 |
| 2022/0268205 | A1 | * | 8/2022 | Seki ....................... H02K 7/085 |
| 2023/0399983 | A1 | * | 12/2023 | Ganiger ................... F02K 3/06 |

* cited by examiner

FORWARD ◄───► AFT

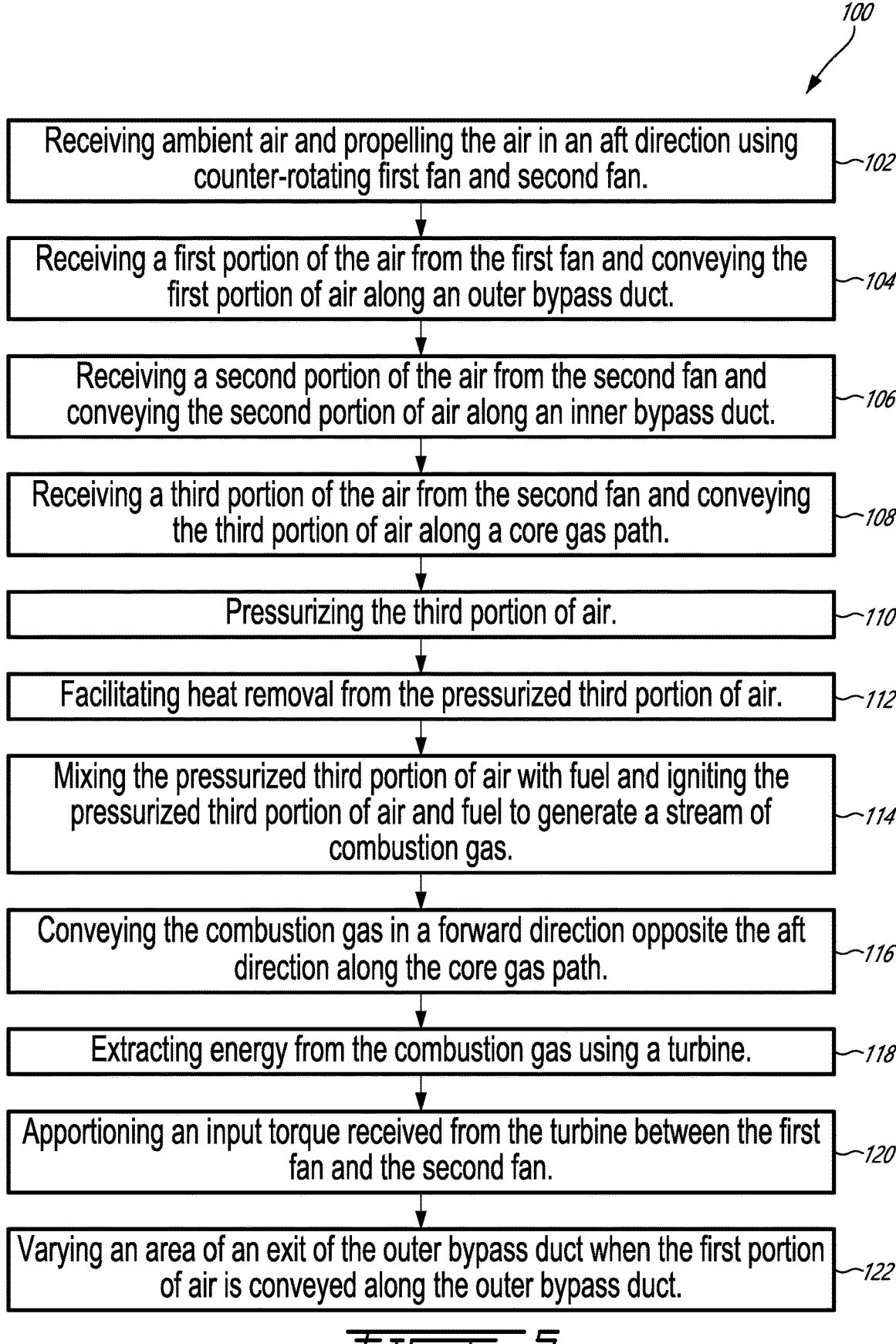

*100*

Receiving ambient air and propelling the air in an aft direction using counter-rotating first fan and second fan. ~*102*

Receiving a first portion of the air from the first fan and conveying the first portion of air along an outer bypass duct. ~*104*

Receiving a second portion of the air from the second fan and conveying the second portion of air along an inner bypass duct. ~*106*

Receiving a third portion of the air from the second fan and conveying the third portion of air along a core gas path. ~*108*

Pressurizing the third portion of air. ~*110*

Facilitating heat removal from the pressurized third portion of air. ~*112*

Mixing the pressurized third portion of air with fuel and igniting the pressurized third portion of air and fuel to generate a stream of combustion gas. ~*114*

Conveying the combustion gas in a forward direction opposite the aft direction along the core gas path. ~*116*

Extracting energy from the combustion gas using a turbine. ~*118*

Apportioning an input torque received from the turbine between the first fan and the second fan. ~*120*

Varying an area of an exit of the outer bypass duct when the first portion of air is conveyed along the outer bypass duct. ~*122*

FIG. 5

DUAL BYPASS TURBOFAN GAS TURBINE ENGINE

TECHNICAL FIELD

The disclosure relates generally to aircraft engines, and more particularly to turbofan gas turbine engines.

BACKGROUND

Gas turbine engines are commonly used to propel aircraft. During flight, a gas turbine engine propelling an aircraft consumes fuel which is carried by the aircraft. The fuel stored onboard the aircraft contributes to the weight that is carried by the aircraft and can affect the range of the aircraft. Improvement in fuel economy of aircraft engines is desirable.

SUMMARY

In one aspect, the disclosure describes a dual bypass turbofan gas turbine engine comprising:
  a first fan and a second fan downstream of the first fan through which ambient air is propelled in an aft direction;
  a first bypass duct receiving first bypass air from the first fan, the first bypass duct including a variable area exhaust nozzle;
  a second bypass duct receiving second bypass air from the second fan;
  a core receiving core air from the second fan, the core including in serial flow communication:
  a first compressor pressurizing the core air;
  a heat exchanger facilitating heat removal from the pressurized core air;
  a second compressor further pressurizing the pressurized core air;
  a combustor in which the pressurized core air is mixed with fuel and ignited to generate a stream of combustion gas; and
  a turbine extracting energy from the combustion gas, a general flow direction of the combustion gas through the turbine being in a forward direction opposite the aft direction;
  a differential gear train operatively connected to split an input torque received from the turbine between the first fan and the second fan, the differential gear train having:
  an input receiving the input torque from the turbine;
  a first output delivering a first output torque to the first fan and driving the first fan in a first rotational direction; and
  a second output delivering a second output torque to the second fan and driving the second fan in a second rotational direction opposite the first rotational direction.

The differential gear train may be a single stage planetary gear train including: a sun gear; one or more planet gears meshed with the sun gear and supported by a planet carrier; and a ring gear surrounding and meshed with the one or more planet gears. The input receiving the input torque from the turbine may be the sun gear of the planetary gear train. The first output delivering a first output torque to the first fan may be the planet carrier of the planetary gear train. The second output delivering the second output torque to the second fan may be the ring gear of the planetary gear train.

The dual bypass gas turbine engine may include a conduit receiving the combustion gas from the turbine and conveying the combustion gas to the first bypass duct.

The conduit may have a conduit outlet discharging the combustion gas into the first bypass duct. The first bypass duct may include a selectively openable outlet forward of the variable area exhaust nozzle. The conduit outlet may be disposed forward of the selectively openable outlet of the first bypass duct.

The heat exchanger may facilitate heat transfer from the pressurized core air to the second bypass air.

The heat exchanger may be disposed inside the second bypass duct.

The first bypass duct may be disposed radially outwardly of the second bypass duct. The second bypass duct may be disposed radially outwardly of the core.

The first fan may have a larger diameter than the second fan.

The first bypass duct may include an upstream outer wall and a downstream outer wall wherein: the downstream outer wall may partially define the variable area exhaust nozzle; the downstream outer wall may be movable relative to the upstream outer wall; the downstream outer wall may be movable between a stowed position defining a first exhaust nozzle area and a deployed position defining a second exhaust nozzle area larger than the first exhaust nozzle area; and the upstream outer wall and the downstream outer wall may define an outlet therebetween for the first bypass air when the downstream outer wall is in the deployed position.

The outlet may be forward of the exhaust nozzle.

The dual bypass gas turbine engine may include an electric generator disposed inside an exhaust cone of the dual bypass gas turbine engine.

The turbine may be a second turbine disposed downstream of a first turbine in the core. The first turbine and the second turbine may be separately rotatable. The electric generator may be driven by the first turbine.

The dual bypass gas turbine engine may include an accessory gearbox inside the exhaust cone. The electric generator may be driven by the first turbine via the accessory gearbox.

The turbine may be a second turbine driving a second shaft. The dual bypass gas turbine engine may include a first turbine extracting energy from the combustion gas. The first turbine may be disposed upstream of the second turbine in the core and driving a first shaft separately rotatable from the second shaft. The first shaft and the second shaft may be coaxial and devoid of axial overlap with each other.

Embodiments may include combinations of the above features.

In a another aspect, the disclosure describes a dual bypass turbofan gas turbine aircraft engine comprising:
  coaxial and counter-rotating first fan and second fan through which ambient air is received and propelled in an aft direction;
  a first bypass duct receiving first bypass air including a first portion of the propelled air, the first bypass duct including a variable area exhaust nozzle;
  a second bypass duct radially inwardly of the first bypass duct and receiving second bypass air including a second portion of the propelled air;
  a core gas path radially inwardly of the second bypass duct and receiving core air including a third portion of the propelled air;
  a compressor pressurizing the core air;
  an intercooler downstream of the compressor and facilitating heat removal from the pressurized core air;

a combustor in which the pressurized core air is mixed with fuel and ignited to generate a stream of combustion gas;

a turbine extracting energy from the combustion gas, a general flow direction of the combustion gas through the turbine being in a forward direction opposite the aft direction; and a differential gear train apportioning an input torque received from the turbine between the first fan and the second fan.

In a further aspect, the disclosure describes a method of operating a dual bypass gas turbine engine. The method comprises:

receiving ambient air and propelling the air in an aft direction using counter-rotating first fan and second fan;

receiving a first portion of the air from the first fan and conveying the first portion of air along a first bypass duct;

receiving a second portion of the air from the second fan and conveying the second portion of air along a second bypass duct;

receiving a third portion of the air from the second fan and conveying the third portion of air along a core gas path;

pressurizing the third portion of air;

facilitating heat removal from the pressurized third portion of air;

mixing the pressurized third portion of air with fuel and igniting the pressurized third portion of air and fuel to generate a stream of combustion gas;

conveying the combustion gas in a forward direction opposite the aft direction along the core gas path;

extracting energy from the combustion gas using a turbine;

apportioning an input torque received from the turbine between the first fan and the second fan; and varying an area of an exit of the first bypass duct when the first portion of air is conveyed along the first bypass duct.

The method may include modulating a rotational speed of the first fan by varying the area of the exit of the first bypass duct.

The method may include discharging the combustion gas from the core gas path into the first bypass duct.

The method may include: conveying the third portion of air in the aft direction while facilitating heat removal from the pressurized third portion of air; further pressurizing the third portion of air after facilitating heat removal from the pressurized third portion of air and before mixing the pressurized third portion of air with fuel; and conveying the third portion of air toward the forward direction before further pressurizing the third portion of air.

Facilitating heat removal from the pressurized third portion of air may include facilitating heat transfer from the pressurized third portion of air to the second portion of air conveyed along the second bypass duct.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 5 is a flow diagram of a method of operating a dual bypass turbofan gas turbine engine.

DETAILED DESCRIPTION

The present disclosure describes dual bypass turbofan gas turbine engines and associated methods. The engines described herein may be suitable to propel aircraft. In some embodiments, the engines and methods described herein may have a variable (i.e., adaptive) cycle so as to promote fuel economy under different operating conditions. Fuel economy may in turn promote lower emissions and economical operation of aircraft.

Aspects of various embodiments are described through reference to the drawings. The term "connected" may include both direct connections (in which two elements contact each other) and indirect connection (in which at least one additional element is located between the two elements). The term "substantially" as used herein may be applied to modify any quantitative representation which could permissibly vary without resulting in a change in the basic function to which it is related.

Figure 1:
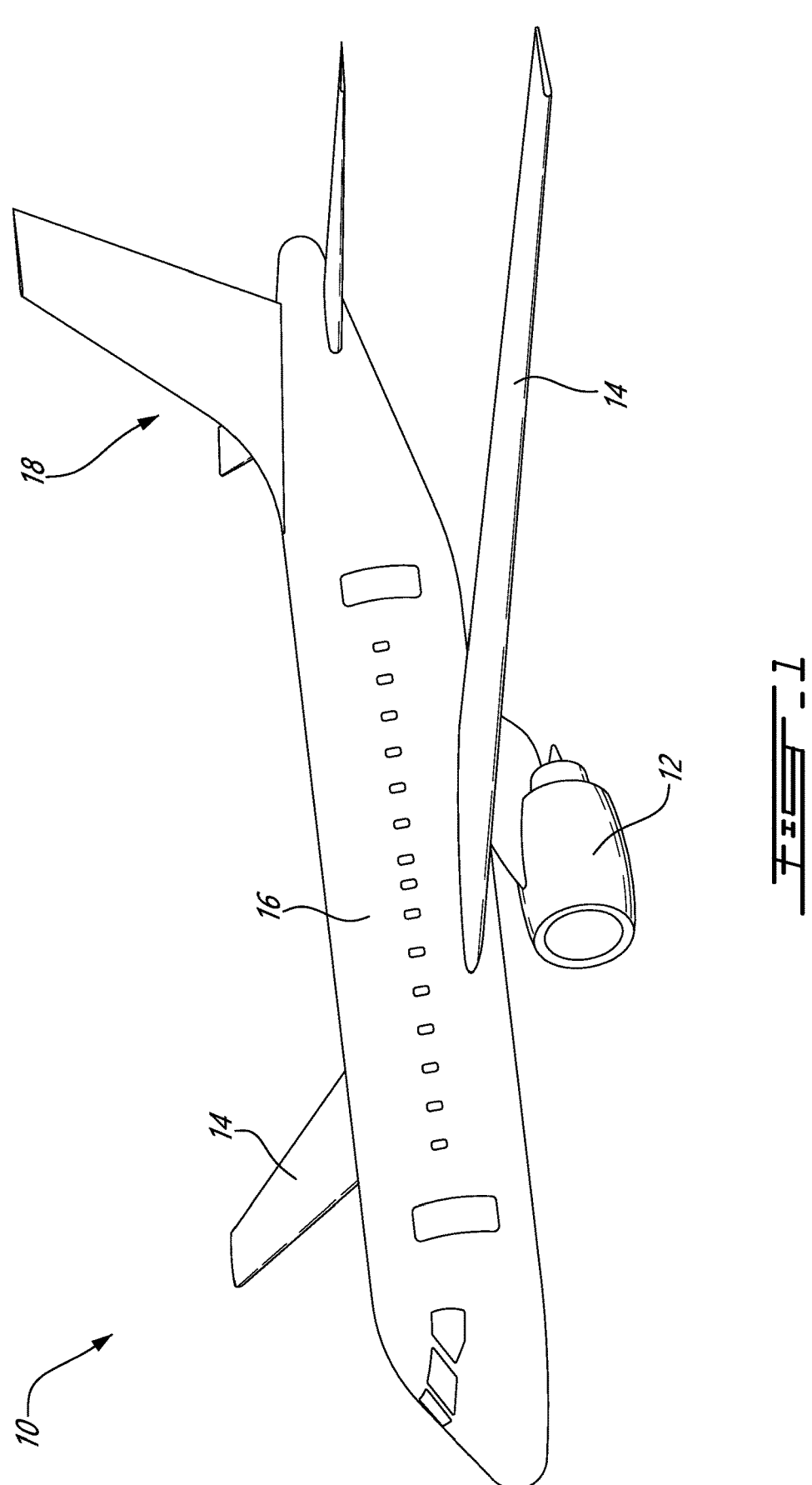
FIG. 1 is a perspective view of an exemplary aircraft including one or more dual bypass turbofan gas turbine engines as described herein.

FIG. 1 is a perspective view of an exemplary aircraft 10 including one or more dual bypass turbofan gas turbine engines 12 (referred hereinafter in the singular as "engine 12") as described herein. Aircraft 10 may be any suitable type of manned or unmanned aircraft such as a private aircraft or a commercial passenger aircraft (e.g., twin-engine airliner). Aircraft 10 may be a fixed-wing aircraft including one or more engines 12 mounted thereto and configured to propel aircraft 10. Aircraft 10 may include one or more wings 14, fuselage 16, empennage 18 and one or more engines 12. Engine(s) 12 may be mounted to fuselage 16 and/or to wings 14.

Figure 2:
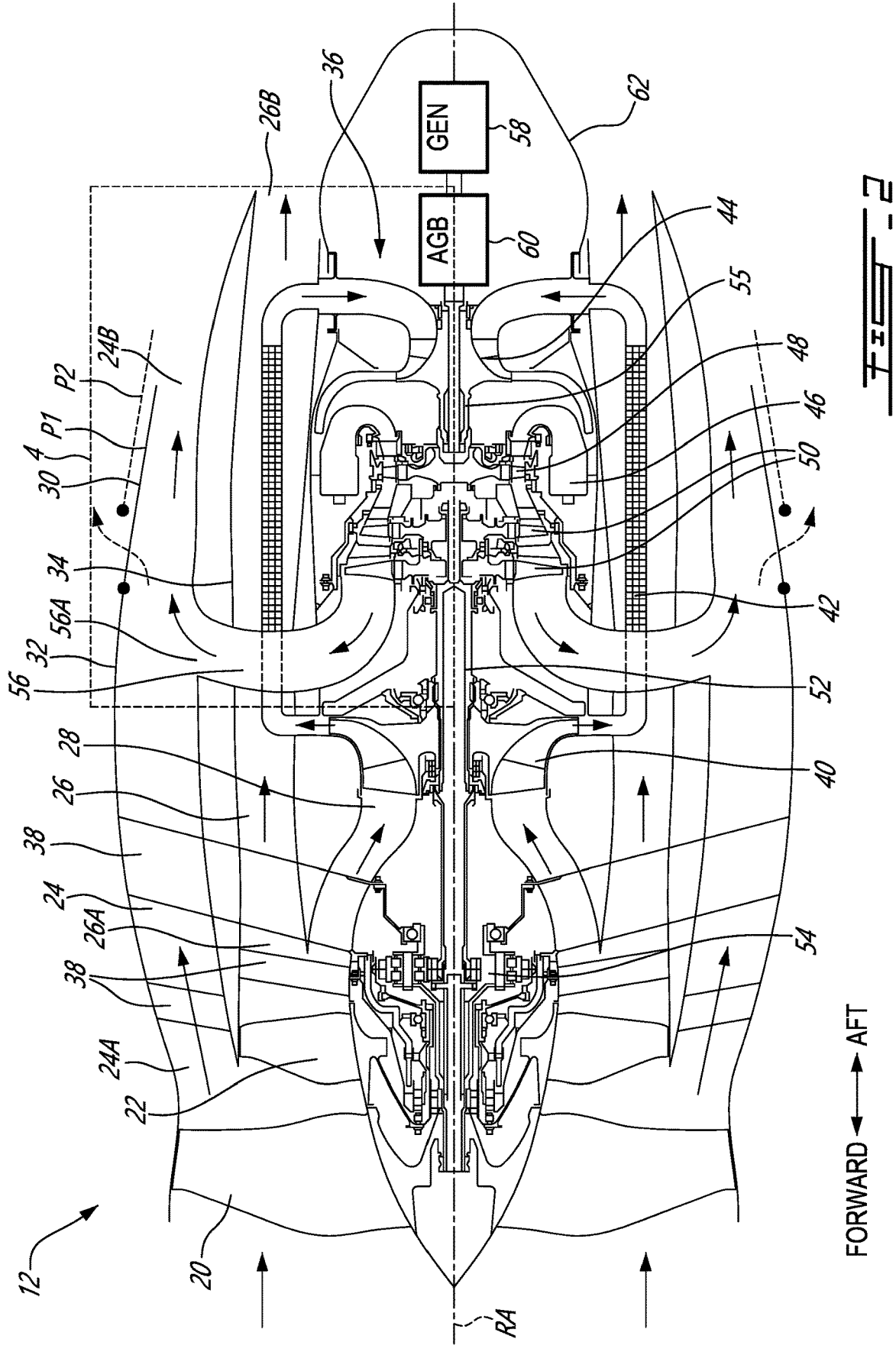
FIG. 2 is a schematic axial cross-section view of an exemplary dual bypass turbofan gas turbine engine of the aircraft of FIG. 1.

FIG. 2 is a schematic axial cross-section view of an exemplary configuration of engine 12. Engine 12 may have a dual bypass turbofan configuration. Engine 12 may be an aircraft engine suitable for use in subsonic flight. Engine 12 may include first fan 20 (e.g., bladed rotor) and second fan 22 (e.g., bladed rotor) through which ambient air is received via an air inlet of engine 12 and propelled by first fan 20 and second fan 22 generally in the aft direction as illustrated in FIG. 2. The forward direction illustrated in FIG. 2 is intended to define the direction of travel of aircraft 10 when propelled by engine 12 during flight. First fan 20 and second fan 22 may be coaxial and may be rotatable about rotation axis RA. Second fan 22 may be disposed downstream (i.e., aft) of first fan 20 relative to the flow of ambient air that is being propelled. First fan 20 and second fan 22 may be configured to rotate in opposite directions (i.e., counter-rotating). In some embodiments, the counter-rotation of first fan 20 and second fan 22 may reduce or eliminate the need for one or more stator vanes disposed between first fan 20 and second fan 22. For example, the axial space between first fan 20 and second fan 22 may be devoid of any stator vanes in some embodiments. First fan 20 may have a larger outer diameter than second fan 22. In other words, second fan 22 may have a smaller outer diameter than first fan 20.

References to the forward and aft directions of fluid flow made herein are not intended to be absolute and perfectly aligned with rotation axis RA. For example, when interacting with blades of first fan 20 and second fan 22, local flows of air through first fan 20 and second fan 22 may deviate from the absolute aft direction but the general overall direction along which the ambient air is propelled may be principally along the aft direction. For example, an aft fluid flow direction may include a direction having a vector component along rotation axis RA and toward the right in FIG. 2 that has a larger magnitude than other vector component(s) of the fluid flow direction. Similarly, a forward fluid flow direction may include a direction having a vector component along rotation axis RA and toward the left in FIG. 2 that has a larger magnitude than other vector component(s) of the fluid flow direction.

The dual bypass configuration of engine 12 may define three flow paths through engine 12. For example, engine 12 may include outer bypass duct 24 conveying a first amount of bypass air through engine 12, inner bypass duct 26 conveying a second amount of bypass air through engine 12, and core gas path 28 conveying core air and combustion gas. Components defining outer bypass duct 24, inner bypass duct 26 and core gas path 28 may be supported by one or more struts 38.

Outer bypass duct 24 may receive and convey a first portion of the propelled air from first fan 20. Outer bypass duct 24 may have an annular configuration and may extend substantially entirely around rotation axis RA and around inner bypass duct 26. Outer bypass duct 24 may include variable area exhaust nozzle 30 (referred hereinafter as "nozzle 30") and radially outer wall 32. Blade tips of first fan 20 may extend radially outwardly and substantially to a forward extension of outer wall 32 of outer bypass duct 24 extending forward of entrance 24A to outer bypass duct 24. In other words, first fan 20 may be ducted/shrouded by the forward extension of outer wall 32.

Outer bypass duct 24 may receive a radially outer portion of the air that is propelled by first fan 20. In some embodiments, second fan 22 may be disposed aft of entrance 24A to outer bypass duct 24. In some embodiments, second fan 22 may have an outer radius that is smaller than a radial distance from rotation axis RA to entrance 24A to outer bypass duct 24. Accordingly, second fan 22 may not propel air into outer bypass duct 24.

Nozzle 30 may permit a size of a cross-sectional area of exit 24B of outer bypass duct 24 to be varied to provide variable cycle operation of engine 12 and promote fuel efficiency during different operating conditions (e.g., phases of flight) of aircraft 10. For example, during take-off and initial climb of aircraft 10 when the thrust produced by engine 12 is relatively high, nozzle 30 may be opened to increase the cross-sectional area of exit 24B to permit more air to flow through outer bypass duct 24. Opening of nozzle 30 may allow to increase the core power and in turn increase the take-off thrust produced by engine 12. On the other hand, during a cruise phase of flight when the thrust produced by engine 12 is lower, nozzle 30 may be partially closed to reduce the size of the cross-sectional area of exit 24B and promote fuel efficiency of engine 12. The (single) variable area exhaust nozzle 30 may allow adaptation of engine 12 to both low ground speed and high cruise speed with reduced compromise between the two modes of operation. Further description of nozzle 30 is provided below in relation to FIG. 4.

Inner bypass duct 26 may be separate from outer bypass duct 24, may be disposed radially inwardly of outer bypass duct 24 and may receive inner (second) bypass air including a second portion of the propelled air. Inner bypass duct 26 may have a substantially annular configuration and may extend substantially entirely around rotation axis RA and around core 36 of engine 12. Inner bypass duct 26 may include radially outer wall 34. Blade tips of second fan 22 may extend radially outwardly and substantially to a forward extension of outer wall 34 of inner bypass duct 26 extending forward of entrance 26A to outer bypass duct 26. In other words, second fan 22 may be ducted/shrouded by the forward extension of outer wall 34. Inner bypass duct 26 may receive and convey a portion of the propelled air from second fan 22. For example, inner bypass duct 26 may receive a radially middle portion of the air that is propelled by first fan 20 and a radially outer portion of the air that is further propelled by second fan 22. In some embodiments, inner bypass duct 26 may not include a variable area nozzle. For example, inner bypass duct 26 may have exit 26B having a non-variable (i.e., fixed-size) cross-sectional area.

Core gas path 28 may extend through core 36 of engine 12. Core gas path 28 may be mostly or entirely disposed radially inwardly of inner bypass duct 26 and may receive core air including a third portion of the propelled air. Portions of core gas path 28 may have a substantially annular configuration and may extend substantially entirely around rotation axis RA. Some portions of core gas path 28 may included one or more separate conduits for conveying the air and/or combustion gas. Core gas path 28 may receive and convey a portion of the propelled air from second fan 22. For example, core gas path 28 may receive a radially inner (i.e., root flow) portion of the air that is propelled by first fan 20 and a radially inner (i.e., root flow) portion of the air that is further propelled by second fan 22.

Core 36 of engine 12 may include, in serial flow communication along core gas path 28, low-pressure (LP) compressor 40 pressurizing the core air, intercooler 42 downstream of LP compressor 40 and facilitating heat removal from the pressurized core air, high-pressure (HP) compressor 44 downstream of intercooler 42 further pressurizing the pressurized core air, combustor 46 in which the pressurized core air is mixed with fuel and ignited to generate a stream of combustion gas, one or more turbines (e.g., bladed rotors) extracting energy from the combustion gas downstream of combustor 46. The one or more turbines may include one or more high-pressure (HP) turbines 48 (referred hereinafter in the singular) and one or more low-pressure (LP) turbines 50 (referred hereinafter in the singular).

The core air may flow in the aft direction when it is discharged from second fan 22 and received into core gas path 28. However, the conduit(s) defining core gas path 28 may cause one or more directional changes in the flow of pressurized core air between LP compressor 40 and HP compressor 44. For example, after exiting LP compressor 40, the pressurized core air may be conveyed radially outwardly and then in the aft direction toward intercooler 42. After exiting intercooler 42, the pressurized core air may be directed radially inwardly and then in the forward direction upstream of HP compressor 44 in preparation for compression by HP compressor 44. In some embodiments, core gas path 28 may optionally cause a flow reversal of the pressurized core air. For example, a general flow direction of the combustion gas through HP turbine 48 and LP turbine 50 may be in a forward direction opposite the aft direction (see FIG. 4 also). In some embodiments, core gas path 28 may cause two 180° turns of the fluid conveyed therein. A first 180° turn of the pressurized core air may occur between intercooler 42 and HP compressor 44. A second 180° turn of the combustion gas may occur between LP turbine 50 and exit 24B of outer bypass duct 24 as the combustion gas is discharged into outer bypass duct 24 and mixed with outer (first) bypass air.

LP compressor 40 may include one or more bladed rotors defining one or more stages of a compression section of core 36 of engine 12. For example, LP compressor 40 may include one or more axial compressors and/or a centrifugal compressor. In some embodiments, LP compressor 40 may include an axial compressor followed by a centrifugal compressor.

Intercooler 42 may be disposed downstream of LP compressor 40 to cool the core air after being pressurized by LP compressor 40. Intercooler 42 may be a suitable type of heat exchanger (e.g., radiator) facilitating heat removal from the core air. Intercooler 42 may facilitate heat transfer from the pressurized core air to a cooling fluid. For example, in some embodiments, intercooler 42 may be an air-to-air intercooler including cooling fins facilitating heat transfer from the pressurized core air to the inner bypass air from inner bypass duct 26. In some embodiments, intercooler 42 may be disposed inside of inner bypass duct 26 so that heat from the pressurized core air may be transferred to the inner bypass air being conveyed along inner bypass duct 26. In some embodiments, after being discharged from LP compressor 40, the pressurized air may be conveyed radially outwardly into inner bypass duct 26 via one or more conduits defining core gas path 28.

In some embodiments, the removal of heat from the pressurized core air may counter the heat of compression and allow the core air to become denser in preparation for further compression by HP compressor 44 and/or for combustion in combustor 46. In some embodiments, the use of intercooler 42 may permit a higher pressure ratio to be achieved during compression of the core air. In some embodiments, the addition of heat to the inner bypass air in inner bypass duct 26 between entrance 26A and exit 26B of inner bypass duct 26 may add energy to the inner bypass air inside of inner bypass duct 26 to increase the exit velocity and momentum of the inner bypass air and thereby increase the thrust output from inner bypass duct 26. In some embodiments, the addition of heat to the inner bypass air may counteract some of the energy losses that may be caused by the presence of intercooler 42 in the flow of inner bypass air inside of inner bypass duct 26. In some situations of the variable cycle of engine 12, the operation of engine 12 may be managed via nozzle 30 for example so that the exhaust temperature of outer bypass duct 24 and the exhaust temperature of inner bypass duct 26 are substantially equal. This feature may promote a reduced overall maximum exhaust temperature from engine 12.

HP compressor 44 may include one or more bladed rotors defining one or more stages of compression. For example, HP compressor 44 may include one or more axial compressors and/or a centrifugal compressor. In some embodiments, HP compressor 44 may include an axial compressor followed by a centrifugal compressor.

HP turbine 48 may be disposed downstream of combustor 46 and upstream of LP turbine 50 along core gas path 28. In some embodiments, engine 12 may include a single HP turbine 48 defining a single stage HP turbine section. In some embodiments, the use of intercooler 42 may facilitate a lower compressor exit temperature upstream of combustor 46 and may in turn not require HP turbine 48 to be actively cooled using pressurized air bled from the compressor section along core gas path 28 for example, and this may promote efficient operation of engine 12. In some embodiments, HP turbine 48 may be uncooled. In some embodiments, HP turbine 48 may be a (e.g., shroud-less) impulse turbine. In some embodiments, HP turbine 48 may be actively cooled using bleed air from a compressor section of engine 12.

Following the combustion of the mixture of fuel and air in combustor 46 and the extraction of energy from the combustion gas by HP turbine 48 and LP turbine 50, the combustion gas may be conveyed radially outwardly to outer bypass duct 24 via one or more conduits 56 (referred hereinafter in the singular). Conduit 56 may cause one or more directional changes in the flow of combustion gas being discharged by LP turbine 50. Conduit 56 may extend radially through inner bypass duct 26 and deliver the combustion gas to outer bypass duct 24 via conduit outlet 56A. Conduit 56 may keep the combustion gas separate from the inner bypass air to prevent mixing of the combustion gas with the inner bypass air. Conduit 56 may also keep the combustion gas separate from the pressurized air flowing between LP compressor 40 and HP compressor 44 to prevent mixing of the combustion gas with the pressurized air.

Conduit outlet 56A may be disposed axially between entrance 24A and exit 24B of outer bypass duct 24. In some embodiments, the discharge of the combustion gas into outer bypass duct 24 may increase the flow rate and temperature of the gas being conveyed by outer bypass duct 24 and discharged from exit 24B of outer bypass duct 24. In some embodiments, the discharge of the combustion gas into outer bypass duct 24 may increase the thrust produced via outer bypass duct 24. In some embodiments, conduit 56 may be shaped to reduce energy losses as the combustion gas is discharged into outer bypass duct 24. For example, conduit 56 may be shaped to cause turning of the flow of combustion gas toward the aft direction immediately upstream of conduit outlet 56A.

LP compressor 40 and LP turbine 50 may be mounted to LP shaft 52 and drivingly connected together to be in torque transmitting engagement via LP shaft 52, which may be rotatably supported in engine 12 via one or more bearings. LP compressor 40, LP turbine 50 and LP shaft 52 may together define a low-pressure spool of engine 12. LP turbine 50 may drive the rotation of LP compressor 40 and of LP shaft 52 about rotation axis RA. As explained further below LP turbine 50 may also drive the rotation of first fan 20 and second fan 22 via LP shaft 52 and differential gear train 54. In some embodiments, engine 12 may include two LP turbines 50 defining a two-stage turbine section driving the rotation of LP shaft 52. Alternatively, three LP turbines 50 defining a three-stage turbine section may be used to drive the rotation of LP shaft 52. In some embodiments one or more turbine stators (i.e., stator vanes 72 shown in FIG. 4) may be disposed between the two LP turbines 50, between HP turbine 48 and the first LP turbine 50 and/or upstream of HP turbine 48.

HP compressor 44 and HP turbine 48 may be mounted to HP shaft 55 and drivingly connected together to be in torque transmitting engagement via HP shaft 55, which may be rotatably supported in engine 12 via one or more bearings. HP compressor 44, HP turbine 48 and HP shaft 55 may together define a high-pressure spool of engine 12. HP turbine 48 may drive the rotation of HP compressor 44 and of HP shaft 55 about rotation axis RA. HP turbine 48 may also drive the rotation of electric generator 58 and/or other mechanical loads (e.g., pumps) via accessory gearbox (AGB) 60. Electric generator 58 may be configured to generate electricity during operation of engine 12 and power one or more electric loads of engine 12 and/or of aircraft 10. In some embodiments, electric generator 58 may be disposed inside exhaust cone 62 of engine 12. In some embodiments, AGB 60 may be disposed inside exhaust cone 62 of engine 12.

The low-pressure spool including LP turbine 50, LP compressor 40 and LP shaft 52 may be separately rotatable from the high-pressure spool including HP turbine 48, HP compressor 44 and HP shaft 55. Specifically, LP shaft 52 and HP shaft 55 may be mechanically disconnected so that LP shaft 52 and HP shaft 55 may be separately rotatable. In some embodiments, LP shaft 52 and HP shaft 55 may both be rotatable about rotation axis RA. In some embodiments, LP shaft 52 and HP shaft 55 may be coaxial. In some embodiments, LP shaft 52 and HP shaft 55 may be axially spaced apart from each other along rotation axis RA. For example, LP shaft 52 and HP shaft 55 may be coaxial and devoid of axial overlap with each other. In other words, LP shaft 52 and HP shaft 55 may not axially overlap each other in some embodiments.

Figure 3:
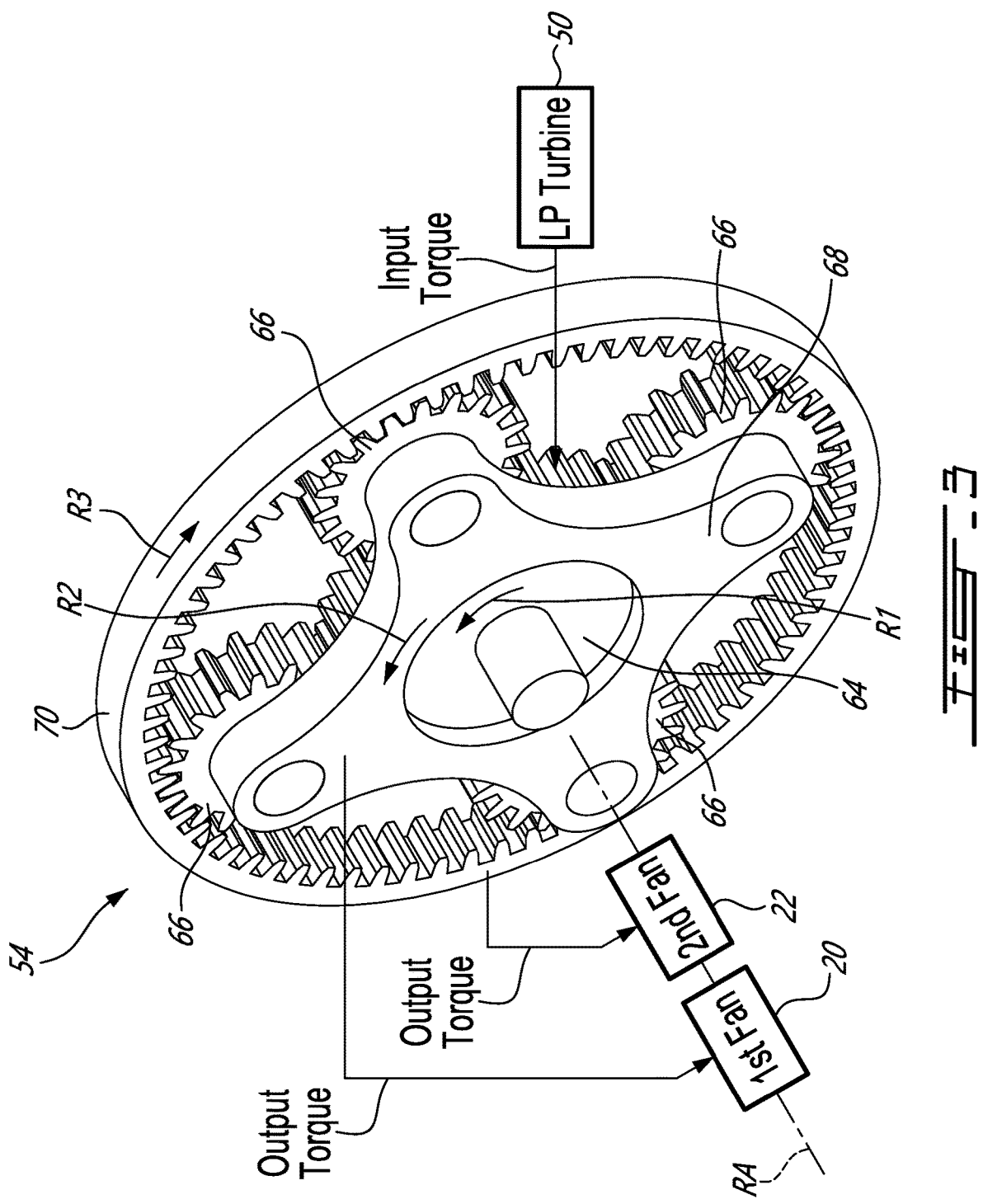
FIG. 3 is a schematic perspective view of an exemplary differential gear train used to drive counter-rotating fans of the dual bypass turbofan gas turbine engine of FIG. 2.

FIG. 3 is a schematic enlarged perspective view of exemplary differential gear train 54 (referred hereinafter as "gear train 54") used to drive counter-rotating first fan 20 and second fan 22 of engine 12. In various embodiments, gear train 54 may include one or more planetary get sets. In some embodiments, gear train 54 may provide a differential functionality where an input torque received from LP turbine 50 is divided (apportioned) between first fan 20 and second fan 22 according to a predetermined ratio. In some embodiments, gear train 54 may also provide a speed reducing functionality so that first fan 20 and second fan 22 may rotate at a slower speed than LP turbine 50.

In some embodiments, gear train 54 may be a planetary differential gear train including sun gear 64, one or more planet gears 66 meshed with sun gear 64 and supported by planet carrier 68, and ring gear 70 surrounding and meshed with planet gears 66. Gear train 54 may include an input such as sun gear 64 receiving input torque from LP turbine 50 via LP shaft 52. Accordingly, sun gear 64 may be drivingly connected to (i.e., in torque-transmitting engagement with) LP shaft 52 and driven by LP turbine 50. As an example, sun gear 64 may be driven in the rotational direction R1 about rotation axis RA at the same rotational speed as LP shaft 52 and LP turbine 50. Gear train 54 may be configured as a differential gear train apportioning torque between two outputs. For example, a first output torque from gear train 54 may be delivered by planet carrier 68 to first fan 20 to drive first fan 20. As an example, planet carrier 68 may be driven to rotate in rotational direction R2 about rotation axis RA due to the meshing of planet gears 66 with sun gear 64. First fan 20 may be drivingly connected to (i.e., in torque-transmitting engagement with) planet carrier 68 and driven by planet carrier 68. A second output torque from gear train 54 may be delivered by ring gear 70, which may be free to rotate, to second fan 22 to drive second fan 22. As an example, ring gear 70 may be driven to rotate in rotational direction R3 about rotation axis RA due to the meshing of planet gears 66 with ring gear 70. Second fan 22 may be drivingly connected to (i.e., in torque-transmitting engagement with) ring gear 70 and driven by ring gear 70.

Gear train 54 may be configured to split the input torque received from LP turbine 50 between first fan 20 and second fan 22 according to a fixed (non-variable) ratio. Gear train 54 may be a single stage planetary gear set providing sufficient speed reduction so that first fan 20 and second fan 22 may have a rotational speed lower than the rotational speed of sun gear 64 and the rotational speed of LP shaft 52. Gear train 54 may provide a fixed (non-variable) torque ratio between first fan 20 and second fan 22. Gear train 54 may be configured so that the proportion of torque delivered to the larger first fan 20 is greater than the proportion of torque delivered to the smaller second fan 22. Due to the fixed torque splitting ratio between first fan 20 and second fan 22, the rotational speeds of first fan 20 and second fan 22 may be determined by the respective loading on first fan 20 and second fan 22. For example, the rotational speed of first fan 20 may be modulated by the adjustment of nozzle 30 to adjust the resistance to flow through outer bypass duct 24. For example, a closing of nozzle 30 may increase the loading on first fan 20 and consequently cause the rotational speed of first fan 20 to decrease for a particular input torque. Conversely, an opening of nozzle 30 may decrease the loading on first fan 20 and consequently cause the rotational speed of first fan 20 to increase for a particular input torque.

The rotational speeds of first fan 20 and of second fan 22 may be interrelated during operation. The speed of second fan 22 may also depend on the loading on second fan 22 offered by inner bypass duct 26. For example, for a particular torque input, the rotational speed of second fan 22 may be modulated by the operation of first fan 20 and also by a choked fixed area exhaust nozzle (i.e., exit 26B having a cross-sectional area of a fixed/non-variable size). Accordingly, first fan 20 and second fan 22 may operate at a varying speed ratio that accommodates the load on each fan 20, 22.

Figure 4:
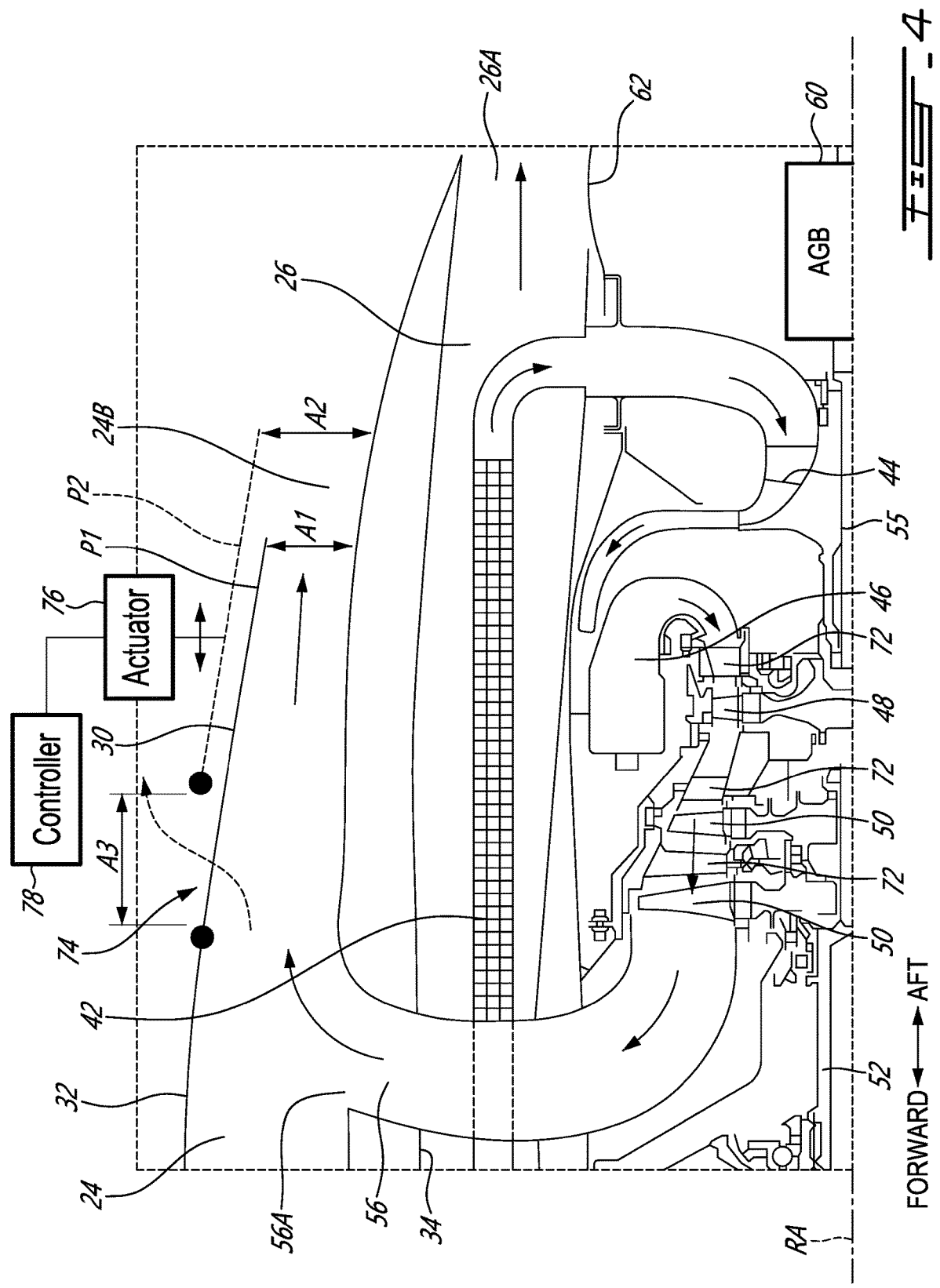
FIG. 4 is an enlarged view of region 4 of the dual bypass turbofan gas turbine engine of FIG. 2.

FIG. 4 is an enlarged view of region 4 of engine 12 shown in FIG. 2. Nozzle 30 may enable a variable geometry to vary the cross sectional area of exit 24B of outer bypass duct 24 in different modes of operation or different phases of flight. Nozzle 30 may be actuated to vary a (bypass) ratio of outer and inner bypass air relative to the core air. In some embodiments nozzle 30 may include an aft outer wall of outer bypass duct 24 that is movable between a stowed position P1 and a deployed position P2 shown in broken lines in FIG. 4. Nozzle 30 may be disposed aft (downstream) of the fixed radially outer wall 32 of outer bypass duct 24. For example, nozzle 30 may be axially movable generally along rotation axis RA relative to radially outer wall 32. In the stowed position P1, nozzle 30 may define exit area A1. In the fully deployed position P2, nozzle 30 may define exit area A2 which may have a larger size than exit area A1. In the stowed position P1, nozzle 30 and radially outer wall 32 may define a substantially continuous radially outer flow surface for the outer bypass air. Moving nozzle 30 toward the deployed position P2 may form opening 74 axially between radially outer wall 32 and nozzle 30 permitting outer bypass air and/or combustion gas to be discharged from outer bypass duct 24 via opening 74. Opening 74 may be forward (upstream) of nozzle 30. Opening 74 may be (e.g., fully) closed when nozzle 30 is in the stowed position P1. Opening 74 may be (e.g., fully) open when nozzle 30 is in the fully deployed position P2. Opening 74 may be selectively openable by the selective actuation of nozzle 30. Opening 74 may have a cross-sectional area A3 when fully open. When nozzle 30 is in the stowed position P1, the total exhaust area of outer bypass duct 24 may be area A1. When nozzle 30 is in the deployed position P2, the total exhaust area of outer bypass duct 24 may be area A2+area A3 which may have a greater size than area A1. In some embodiments, the sum of areas A2 and A3 may be two to three times larger than area A1.

In some embodiments, conduit outlet 56A via which combustion gas is discharged into outer bypass duct 24 may be disposed axially forward of opening 74. Accordingly, combustion gas may be permitted to mix with outer bypass air upstream of opening 74. In some embodiments, some combustion gas may be permitted to exit outer bypass duct 24 via opening 74 and/or via exit 24B.

In various embodiments, nozzle 30 may be actuated via a suitable actuator 76. Actuator 76 may be a mechanical, hydraulic, pneumatic, electrical or other suitable actuator. Actuator 76 may be controlled using a controller 78, suitable for controlling the position of nozzle 30 based on the mode of operation of engine 12 and/or based on a (e.g., throttle) command from a pilot of aircraft 10. In various embodiments, controller 78 may include or form part of a Full Authority Digital Engine Control (FADEC) which may, for example, include one or more digital computer(s) or other data processors, sometimes referred to as electronic engine controller(s) (EEC) and related accessories that control at least some aspects of performance of engine 12. Controller 78 may for example be configured to make decisions regarding the control of engine 12. Controller 78 may be configured to provide optimum engine efficiency for a given flight condition. Controller 78 may include one or more microcontrollers or other suitably programmed or programmable logic circuits.

FIG. 5 is a flow diagram of a method 100 of operating engine 12 or other dual bypass turbofan gas turbine engine. Aspects of engine 12 may be incorporated into method 100. Method 100 may include other actions including other actions disclosed herein. In various embodiments, method 100 may include:

receiving ambient air and propelling the air in an aft direction using counter-rotating first fan 20 and second fan 22 (block 102);

receiving a first portion of the air (outer bypass air) from first fan 20 and conveying the first portion of air along outer bypass duct 24 (block 104);

receiving a second portion of the air (inner bypass air) from second fan 22 and conveying the second portion of air along inner bypass duct 26 (block 106);

receiving a third portion of the air (core air) from second fan 22 and conveying the third portion of air along core gas path 28 (block 108);

pressurizing the third portion of air (block 110);

facilitating heat removal from the pressurized third portion of air (block 112);

mixing the pressurized third portion of air with fuel and igniting the pressurized third portion of air and fuel to generate a stream of combustion gas (block 114);

conveying the combustion gas in a forward direction opposite the aft direction along core gas path 28 (block 116);

extracting energy from the combustion gas using LP turbine 50 (block 118);

apportioning an input torque received from LP turbine 50 between first fan 20 and second fan 22 (block 120); and varying an area of exit 24B of the first bypass duct 24 when the first portion of air is conveyed along outer bypass duct 24 (block 122).

Method 100 may include modulating a rotational speed of first fan 20 by varying the area of exit 24B of outer bypass duct 24.

Method 100 may include discharging the combustion gas from core gas path 28 into outer bypass duct 24.

Method 100 may include conveying the third portion of air in the aft direction while facilitating heat removal from the pressurized third portion of air. Method 100 may include further pressurizing the third portion of air after facilitating heat removal from the pressurized third portion of air and before mixing the pressurized third portion of air with fuel. Method 100 may include conveying the third portion of air toward the forward direction before further pressurizing the third portion of air.

Facilitating heat removal from the pressurized third portion of air may include facilitating heat transfer from the pressurized third portion of air to the second portion of air conveyed along the inner bypass duct.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A dual bypass turbofan gas turbine engine comprising:

a first fan and a second fan downstream of the first fan through which ambient air is propelled in an aft direction;

a first bypass duct receiving first bypass air from the first fan, the first bypass duct including a variable area exhaust nozzle;

a second bypass duct receiving second bypass air from the second fan;

a core receiving core air from the second fan, the core including in serial flow communication:

a first compressor pressurizing the core air;

a heat exchanger facilitating heat removal from the pressurized core air;

a second compressor further pressurizing the pressurized core air;

a combustor in which the pressurized core air is mixed with fuel and ignited to generate a stream of combustion gas; and a turbine extracting energy from the combustion gas, a general flow direction of the combustion gas through the turbine being in a forward direction opposite the aft direction;

a differential gear train operatively connected to split an input torque received from the turbine between the first fan and the second fan, the differential gear train having:

an input receiving the input torque from the turbine;

a first output delivering a first output torque to the first fan and driving the first fan in a first rotational direction; and a second output delivering a second output torque to the second fan and driving the second fan in a second rotational direction opposite the first rotational direction, wherein:

the first bypass duct includes an upstream outer wall and a downstream outer wall;

the downstream outer wall partially defines the variable area exhaust nozzle;

the downstream outer wall is movable relative to the upstream outer wall;

the downstream outer wall is movable between a stowed position defining a first exhaust nozzle area and a deployed position defining a second exhaust nozzle area larger than the first exhaust nozzle area; and the upstream outer wall and the downstream outer wall define an outlet therebetween for the first bypass air when the downstream outer wall is in the deployed position.

2. The dual bypass turbofan gas turbine engine as defined in claim 1, wherein:

the differential gear train is a single stage planetary gear train including:

a sun gear;

one or more planet gears meshed with the sun gear and supported by a planet carrier; and a ring gear surrounding and meshed with the one or more planet gears;

the input receiving the input torque from the turbine is the sun gear of the planetary gear train;

the first output delivering a first output torque to the first fan is the planet carrier of the planetary gear train; and the second output delivering the second output torque to the second fan is the ring gear of the planetary gear train.

3. The dual bypass gas turbine engine as defined in claim 1, comprising a conduit receiving the combustion gas from the turbine and conveying the combustion gas to the first bypass duct.

4. The dual bypass gas turbine engine as defined in claim 3, wherein:

the conduit has a conduit outlet discharging the combustion gas into the first bypass duct;

the first bypass duct includes the outlet between the upstream outer wall and the downstream outer wall is a selectively openable outlet forward of the variable area exhaust nozzle; and the conduit outlet is disposed forward of the selectively openable outlet of the first bypass duct.

5. The dual bypass gas turbine engine as defined in claim 1, wherein the heat exchanger facilitates heat transfer from the pressurized core air to the second bypass air.

6. The dual bypass gas turbine engine as defined in claim 1, wherein the heat exchanger is disposed inside the second bypass duct.

7. The dual bypass gas turbine engine as defined in claim 1, wherein:

the first bypass duct is disposed radially outwardly of the second bypass duct; and the second bypass duct is disposed radially outwardly of the core.

8. The dual bypass gas turbine engine as defined in claim 1, wherein the first fan has a larger diameter than the second fan.

9. The dual bypass gas turbine engine as defined in claim 1, wherein the outlet is forward of the exhaust nozzle.

10. The dual bypass gas turbine engine as defined in claim 1, comprising an electric generator disposed inside an exhaust cone of the dual bypass gas turbine engine.

11. The dual bypass gas turbine engine as defined in claim 10, wherein:

the turbine is a second turbine disposed downstream of a first turbine in the core;

the first turbine and the second turbine are separately rotatable; and the electric generator is driven by the first turbine.

12. The dual bypass gas turbine engine as defined in claim 11, comprising an accessory gearbox inside the exhaust cone, the electric generator being driven by the first turbine via the accessory gearbox.

13. The dual bypass gas turbine engine as defined in claim 1, wherein:

the turbine is a second turbine driving a second shaft;

the dual bypass gas turbine engine includes a first turbine extracting energy from the combustion gas, the first turbine being disposed upstream of the second turbine in the core and driving a first shaft separately rotatable from the second shaft; and the first shaft and the second shaft are coaxial and devoid of axial overlap with each other.

* * * * *